US012488955B2

(12) United States Patent
Yoneda

(10) Patent No.: US 12,488,955 B2

(45) Date of Patent: Dec. 2, 2025

(54) FUSE ELEMENT, FUSE DEVICE, AND PROTECTION DEVICE

(71) Applicant: DEXERIALS CORPORATION, Tochigi (JP)

(72) Inventor: Yoshihiro Yoneda, Shimotsuke (JP)

(73) Assignee: DEXERIALS CORPORATION, Tochigi (JP)

( * ) Notice: Subject to any disclaimer, the term of this patent is extended or adjusted under 35 U.S.C. 154(b) by 138 days.

(21) Appl. No.: 17/753,134

(22) PCT Filed: Aug. 13, 2020

(86) PCT No.: PCT/JP2020/030803
§ 371 (c)(1),
(2) Date: Feb. 21, 2022

(87) PCT Pub. No.: WO2021/039426
PCT Pub. Date: Mar. 4, 2021

(65) Prior Publication Data

US 2022/0277916 A1 Sep. 1, 2022

(30) Foreign Application Priority Data

Aug. 23, 2019 (JP) ................................ 2019-152939

(51) Int. Cl.
*H01H 85/06* (2006.01)
*H01H 85/041* (2006.01)
(Continued)

(52) U.S. Cl.
CPC ........ *H01H 85/06* (2013.01); *H01H 85/0411* (2013.01); *H01H 85/143* (2013.01); *H01H 2085/0414* (2013.01); *H01H 85/08* (2013.01)

(58) Field of Classification Search
CPC .. H01H 85/06; H01H 85/0411; H01H 85/143; H01H 85/08; H01H 2085/0414; H01H 85/055; H01H 37/76
See application file for complete search history.

(56) References Cited

U.S. PATENT DOCUMENTS 5,949,323 A * 9/1999 Huggins ............ H01L 23/5258 257/209
10,727,019 B2 * 7/2020 Yoneda ............ H01H 85/0056
(Continued)

FOREIGN PATENT DOCUMENTS

JP 2003249155 A 9/2003
JP 2005063828 A 3/2005
(Continued)

OTHER PUBLICATIONS

Yoneda Yoshihiro, "Current Fuse", Aug. 24, 2017, Dexerials Corp., Entire Document (Translation of WO 2017141675) (of record, cited in the IDS, including Original Document) (Year: 2017).*
(Continued)

*Primary Examiner* — Stephen S Sul
(74) *Attorney, Agent, or Firm* — Schwegman Lundberg & Woessner, P.A.

(57) ABSTRACT

A fuse element is a fuse element (1) including a flat plate-shaped blowout section (1*e*) with no through-hole disposed between a first terminal (20*a*) and a second terminal (20*b*), in which a width (1*d*) of the blowout section (1*e*) has a length equal to or greater than 80% of a width (2*d*) of each of joining portions joining the first terminal (20*a*) and the second terminal (20*b*) to the blowout section (1*e*). The width (1*d*) of the blowout section (1*e*) is preferably a length equal to or greater than 95% of the width (2*d*) of each of the joining portions.

11 Claims, 6 Drawing Sheets

(51) Int. Cl.
*H01H 85/143* (2006.01)
*H01H 85/08* (2006.01)

(56) References Cited

U.S. PATENT DOCUMENTS

| | | | | |
|---|---|---|---|---|
| 11,640,892 | B2 * | 5/2023 | Nakajima | B32B 15/01 337/142 |
| 2009/0309689 | A1 * | 12/2009 | Pavlovic | H01R 13/18 337/187 |
| 2010/0176910 | A1 * | 7/2010 | Knab | H01H 37/761 337/290 |
| 2013/0234822 | A1 * | 9/2013 | Aurich | B22D 41/015 337/416 |
| 2015/0084734 | A1 * | 3/2015 | Yoneda | H01H 85/06 337/183 |
| 2015/0145637 | A1 * | 5/2015 | Nitta | H01H 85/0052 337/184 |
| 2015/0340186 | A1 * | 11/2015 | Yoneda | H01H 85/0241 337/412 |
| 2016/0013001 | A1 | 1/2016 | Yoneda et al. | |
| 2016/0172143 | A1 * | 6/2016 | Yoneda | H01H 85/2045 337/186 |
| 2016/0240342 | A1 * | 8/2016 | Yoneda | H01H 85/08 |
| 2017/0236665 | A1 * | 8/2017 | Furuuchi | H01H 85/046 337/414 |
| 2018/0033578 | A1 * | 2/2018 | Ogawa | H01H 69/022 |

FOREIGN PATENT DOCUMENTS

| | | | | |
|---|---|---|---|---|
| JP | 2007207558 | A | | 8/2007 |
| JP | 2010015715 | A | | 1/2010 |
| JP | 5737664 | B2 | | 5/2015 |
| JP | 2016035816 | A | | 3/2016 |
| JP | 2017022009 | A | * | 1/2017 |
| JP | 6420053 | B2 | | 11/2018 |
| JP | 6527323 | B2 | | 5/2019 |
| JP | 6527323 | | | 6/2019 |
| JP | 6577118 | B2 | | 9/2019 |
| JP | 6756490 | B2 | | 8/2020 |
| JP | 6756490 | | | 9/2020 |
| TW | 503421 | | | 9/2002 |
| TW | 201611069 | | | 3/2016 |
| TW | 201622868 | | | 7/2016 |
| TW | 201802854 | | | 1/2018 |
| WO | WO-2017141675 | A1 | | 8/2017 |

OTHER PUBLICATIONS

Kakinuma Toru; Mukai Koichi, “Protection Element and Fuse Element”, Jan. 26, 2017, Dexerials Corp, Entire Document (Translation of JP2017022009). (Year: 2017).*

“Taiwanese Application Serial No. 109128655, Office Action dated Aug. 22, 2023”, w English Translation, (Aug. 22, 2023), 12 pgs.

“International Application Serial No. PCT/JP2020/030803, International Preliminary Report on Patentability dated May 10, 2021”, w/ English Amendments, (May 10, 2021), 15 pgs.

“International Application Serial No. PCT/JP2020/030803, International Search Report dated Oct. 20, 2020”, w/ English Translation, (Oct. 20, 2020), 4 pgs.

“International Application Serial No. PCT/JP2020/030803, Written Opinion dated Oct. 20, 2020”, (Oct. 20, 2020), 3 pgs.

“Japanese Application No. 2019-152939, Submission for publications dated Dec. 13, 2022”, (Dec. 13, 2022), 11 pgs.

* cited by examiner

FUSE ELEMENT, FUSE DEVICE, AND PROTECTION DEVICE

PRIORITY APPLICATIONS

This application is a U.S. National Stage Filing under 35 U.S.C. § 371 from International Application No. PCT/JP2020/030803, filed on Aug. 13, 2020, and published as WO2021/039426 on Mar. 4, 2021, which claims the benefit of priority to Japanese Application No. 2019-152939, filed Aug. 23, 2019; the benefit of priority of each of which is hereby claimed herein, and which applications and publication are hereby incorporated herein by reference in their entireties.

TECHNICAL FIELD

The present invention relates to a fuse element, a fuse device, and a protection device.

BACKGROUND ART

A fuse device is known as a current cutoff element that cuts off a current path in a case where an overcurrent exceeding a rated current flows through a circuit board. In such a fuse device, a fuse element is blown out due to heat generation caused by an overcurrent to cut off the current path.

For example, Patent Document 1 describes a fuse including a fuse element that has terminal sections on both sides of a blowout section, and a casing that surrounds the blowout section, and the blowout section is provided with a notch or a plurality of small holes.

Patent Document 2 describes a chip-type fuse in which a fuse positioned between two flat plate-shaped sections is formed integrally with the two flat plate-shaped sections. Patent Document 2 describes the chip-type fuse in which connecting sections are formed at both ends of a fuse body, and a long edge of the connecting sections is longer than a width dimension of the fuse body.

A protection device using a heat-generating element (heater) is known as a current cutoff element that cuts off a current path in a case where an abnormality other than the occurrence of an overcurrent occurs in a circuit board. In the protection device, a fuse element is blown out due to heat generated by the heat-generating element. The heat-generating element generates heat with a current flowing therethrough at the time of an abnormality other than the occurrence of an overcurrent.

CITATION LIST

Patent Documents

[Patent Document 1]
Japanese Unexamined Patent Application, First Publication No. 2010-15715
[Patent Document 2]
Japanese Patent No. 5737664

SUMMARY OF INVENTION

Technical Problem

In recent years, an increase in a rated current has been required in fuse devices and protection devices.

In a high-rated fuse device of the related art, as a material of the fuse element, a high-melting-point metal, such as copper (melting point 1085° C.), is used. In a fuse element composed of a high-melting-point metal, such as copper, a heat-generating point where heat is locally generated is formed in a blowout section. With this, excessive heating of the terminal coupled to the blowout section of the fuse element can be prevented, such that an electronic apparatus to which the fuse device is attached does not exceed a heat resistance temperature. For example, in an electronic apparatus that forms electrical connection using solder, the heat resistance temperature is about 220° C.

The heat-generating point in the fuse element is formed by providing a plurality of small holes in the blowout section or by thinning the width of the blowout section. For example, Patent Document 1 describes the fuse element in which the blowout section is provided with the notch or a plurality of small holes. Patent Document 2 describes the chip-type fuse in which the long edge of the connecting sections is longer than the width dimension of the fuse body.

In the fuse element composed of a high-melting-point metal, such as copper, there is a need to secure a distance between the heat-generating point and each of the terminals coupled to the blowout section such that the terminal is not excessively heated due to heat from the heat-generating point. This is a factor that obstructs a reduction in size in a fuse device having a large rated current as will be described below.

In a fuse element disposed between two terminals, a length (a length between the two terminals) of the fuse element and a resistance value are in a proportional relationship. Accordingly, in a case where the fuse element is extended to increase a distance between the heat-generating point and each of the terminals, such that excessive heating of the terminal is prevented, the resistance of the fuse element increases. For this reason, it is difficult to increase the rated current of the fuse device including the fuse element.

In order to increase the distance between the heat-generating point and each of the terminals coupled to the blowout section and to suppress an increase in resistance of the fuse element, it may be available to increase the cross-sectional area of the blowout section increase. However, in a case where the cross-sectional area of the blowout section increases and the resistance of the fuse element decreases accordingly, the amount of heat of the heat-generating point increases. As a result, the distance between the heat-generating point and each of the terminals should be further increased to suppress overheating of the terminal.

From this, in the fuse device including the fuse element that is composed of a high-melting-point metal, it is difficult to achieve both a reduction in size of the fuse device and an increase in rated current.

The invention has been accomplished in view of the above-described situation, and an object of the invention is to provide a fuse element capable of contributing to an increase in rated current and a reduction in size of a fuse device and a protection device.

An object of the invention is to provide a fuse device and a protection device including the fuse element, capable of contributing to an increase in rated current and a reduction in size.

Solution to Problem

The invention provides the following means to solve the above-described problem.

(1) A fuse element includes a flat plate-shaped blowout section with no through-hole disposed between a first terminal and a second terminal, in which a width of the blowout section has a length equal to or greater than 100% of a width of each of joining portions joining the first terminal and the second terminal to the blowout section.

(2) In the fuse element described in (1) above, a blowout temperature of the blowout section may be 140° C. to 400° C.

(3) In the fuse element described in (1) or (2) above, the blowout section may be formed in such a manner that a low-melting-point metal layer and a high-melting-point metal layer having a melting point higher than the low-melting-point metal layer are laminated in a thickness direction.

(4) In the fuse element described in (3) above, the low-melting-point metal layer may be composed of Sn or an alloy containing Sn as a primary constituent, and the high-melting-point metal layer may be composed of any one selected from Ag, Cu, an alloy containing Ag as a primary constituent, and an alloy containing Cu as a primary constituent.

(5) In the fuse element described in (3) or (4) above, the blowout section may be composed of the low-melting-point metal layer and the high-melting-point metal layers laminated on both surfaces of the low-melting-point metal layer.

(6) In the fuse element described in (5) above, side surfaces of the blowout section on each side joining to the first terminal and the second terminal may be coated with high melting-point metal layer.

(7) In the fuse element described in any one of (1) to (6) above, the width of the blowout section may be a length equal to or less than 200% of the width of each of the joining portions.

(8) In the fuse element described in any one of (1) to (7) above, the blowout section may be joined to the first terminal and the second terminal by a conductive connection member.

(9) A fuse device includes the fuse element described in any one of (1) to (8) above.

(10) In the fuse device described in (9) above, the first terminal and the second terminal may be disposed on a front surface of an insulating substrate.

(11) A protection device includes the fuse element described in any one of (1) to (8) above, and

- a heat-generating element configured to heat the fuse element to be blown out,
- in which the first terminal and the second terminal are disposed on an insulating substrate, and
- the fuse element is disposed across the first terminal and the second terminal.

Advantageous Effects of Invention

The fuse element of the invention can contribute to an increase in rated current and a reduction in size in the fuse device and the protection device including the fuse element.

The fuse device and the protection device of the invention include the fuse element of the invention, and can thus contribute to an increase in rated current and a reduction in size.

BRIEF DESCRIPTION OF DRAWINGS

FIG. 2(*b*) is a side view of the fuse device shown in FIG. 2(*a*) from a lower side of FIG. 2(*a*).

FIG. 2(*c*) is a side view of the fuse device shown in FIG. 2(*a*) from a right side of FIG. 2(*a*).

FIG. 3(*b*) is a side view of the fuse device shown in FIG. 3(*a*) from a lower side of FIG. 3(*a*). FIG. 3(*c*) is a side view of the fuse device shown in FIG. 3(*a*) from a right side of FIG. 3(*a*). FIG. 3(*d*) is a perspective view showing a fuse element provided in the fuse device shown in FIG. 3(*a*).

FIG. 4(*b*) is a side view of the fuse device shown in FIG. 4(*a*) from a lower side of FIG. 4(*a*).

FIG. 4(*c*) is a side view of the fuse device shown in FIG. 4(*a*) from a right side of FIG. 4(*a*).

FIG. 5(*b*) is a sectional view along the line B-B' of the protection device shown in FIG. 5(*a*). FIG. 5(*c*) is a side view of the protection device shown in FIG. 5(*a*) from a right side of FIG. 5(*a*).

FIG. 6(*b*) is a side view of the protection device shown in FIG. 6(*a*) from a lower side of FIG. 6(*a*). FIG. 6(*c*) is a side view of the protection device shown in FIG. 6(*a*) from a right side of FIG. 6(*a*).

DESCRIPTION OF EMBODIMENTS

Figure 1:
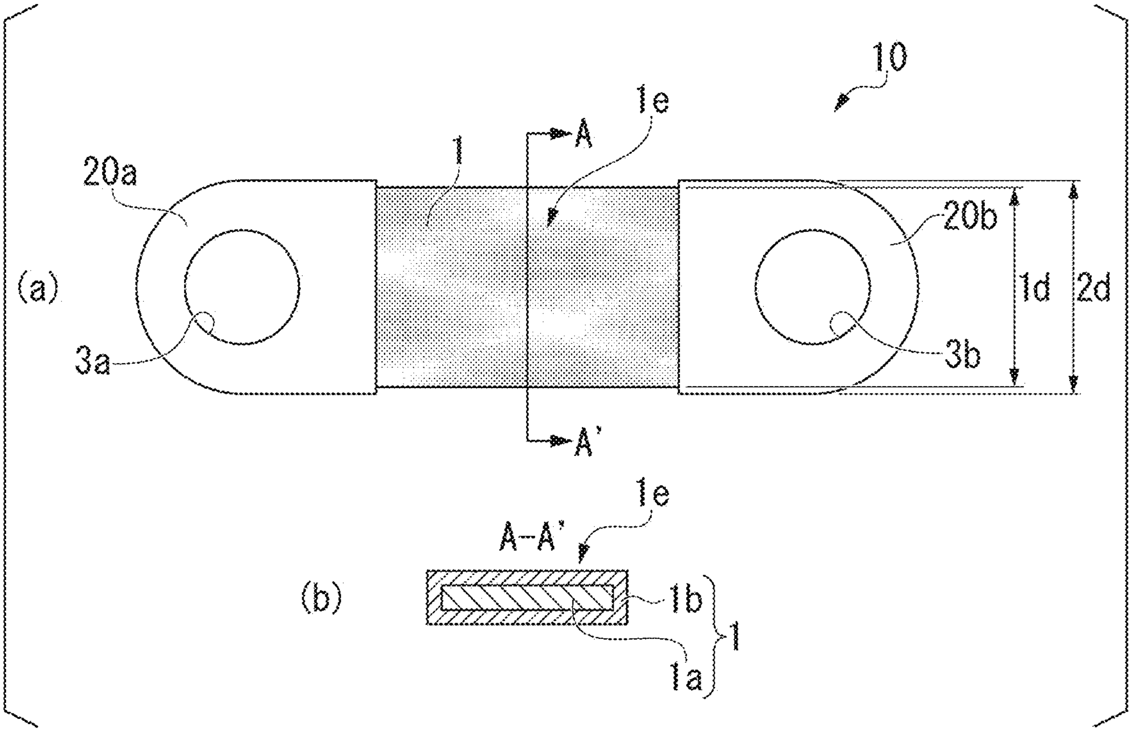
FIG. 1(*a*) is a plan view showing a fuse device of a first embodiment, and FIG. 1(*b*) is a sectional view along the line A-A' of the fuse device shown in FIG. 1(*a*).

Hereinafter, a fuse element, a fuse device, and a protection device according to the invention will be described in detail appropriately referring to the drawings. The drawings used in the following descriptions may be drawn with feature portions enlarged for convenience to facilitate understanding of the features of the invention, and dimensional ratios and the like between the constituent elements may differ from the actual values. Materials, dimensions, and the like exemplified in the following description are merely examples, which are not intended to limit the invention, and can be appropriately changed within a range in which effects of the invention are obtained.

First Embodiment (Fuse Device)

FIG. 1(*a*) is a plan view showing a fuse device of a first embodiment, and FIG. 1(*b*) is a sectional view along the line A-A' of the fuse device shown in FIG. 1(*a*). As shown in FIG. 1(*a*), a fuse device 10 of the embodiment has a first terminal 20*a*, a second terminal 20*b*, and a fuse element 1 of the embodiment composed of a blowout section 1*e* disposed between the first terminal 20*a* and the second terminal 20*b*.

(Fuse Element)

The fuse element 1 provided in the fuse device 10 of the embodiment is composed of the blowout section 1*e*. The fuse element 1 electrically connects the first terminal 20*a* and the second terminal 20*b*. The blowout section 1*e* (fuse element 1) is joined to the first terminal 20*a* and the second terminal 20*b* by a conductive connection member, such as solder, to be electrically connected.

As shown in FIG. 1(*a*), the blowout section 1*e* is a flat plate-shaped section with no through-hole, and the thickness of which is substantially constant. As shown in FIG. 1(*a*), the blowout section 1*e* has a substantially rectangular shape in a plan view having a direction connecting the first terminal 20*a* and the second terminal 20*b* as a long side and a direction substantially perpendicular to the direction connecting the first terminal 20*a* and the second terminal 20*b* (hereinafter, also referred to as a "width direction") as a short side.

In the fuse device 10 shown in FIG. 1(*a*), although a case where the blowout section 1*e* includes the fuse element 1 having a substantially rectangular shape in a plan view has been described as an example, the shape of the blowout section of the fuse element is not limited to the substantially rectangular shape in a plan view. For example, a width and a thickness of the blowout section 1*e* may not be constant.

A blowout temperature of the blowout section 1*e* is preferably 140° C. to 400° C. In a case where the blowout temperature of the blowout section 1*e* is equal to or higher than 140° C., preferably, the fuse device 10 is not blown out at a normally used temperature. In a case where the blowout temperature of the blowout section 1*e* is equal to or lower than 400° C., the first terminal 20*a* and the second terminal 20*b* can be prevented from reaching a high temperature at the time of blowout and negatively affecting members connected to the first terminal 20*a* and the second terminal 20*b*.

In the fuse device 10 of the embodiment, as shown in FIG. 1(*b*), the blowout section 1*e* (fuse element 1) is preferably formed of a flat plate-shaped low-melting-point metal layer 1*a* having a rectangular shape in sectional view and a high melting metal layer 1*b* laminated in such a manner that the entire surface of the low-melting-point metal layer 1*a* is coated at a substantially constant thickness. In this case, as shown in FIG. 1(*b*), the blowout section 1*e* has a three-layered structure composed of the low-melting-point metal layer 1*a* and high-melting-point metal layers 1*b* laminated on both surfaces of the low-melting-point metal layer 1*a* in a thickness direction, and all side surfaces of the low-melting-point metal layer 1*a* are coated with the high-melting-point metal layers 1*b*. For this reason, leakage of the low-melting-point metal layer 1*a* from the blowout section 1*e* or inflow of the conductive connection member, such as solder, into the blowout section 1*e* due to heating at the time of reflow in a manufacturing process of the fuse device 10 is suppressed. As a result, fluctuation of a resistance value of the blowout section 1*e* due to deformation of the blowout section 1*e* (fuse element 1) at the time of the reflow in the manufacturing process of the fuse device 10 is suppressed, and the fuse device 10 having a stable blowout characteristic can be easily manufactured.

The low-melting-point metal layer 1*a* is preferably composed of Sn or an alloy containing Sn as a primary constituent. The content of Sn in the alloy containing Sn as a primary constituent is preferably equal to or greater than 50 mass %, and more preferably, equal to or greater than 60% by mass. Examples of the alloy containing Sn as a primary constituent include a Sn—Bi alloy, an In—Sn alloy, and a Sn—Ag—Cu alloy.

The high-melting-point metal layer 1*b* is preferably a layer having a higher melting point than the low-melting-point metal layer 1*a* and is a layer composed of a metal material that is dissolved by a molten material of the low-melting-point metal layer 1*b*.

The melting point of the high-melting-point metal layer 1*b* is preferably within a range of a temperature at least 100° C. higher than the melting point of the low-melting-point metal layer 1*a* and equal to or lower than a temperature 900° C. higher than the melting point of the low-melting-point metal layer 1*a*.

The high-melting-point metal layer 1*b* is preferably composed of any one selected from Ag, Cu, an alloy containing Ag as a primary constituent, and an alloy containing Cu as a primary constituent, and more preferably, composed of Ag or an alloy containing Ag as a primary constituent. The content of Ag in the alloy containing Ag as a primary constituent is preferably equal to or greater than 50% by mass, and more preferably, equal to or greater than 60% by mass. Examples of the alloy containing Ag as a primary constituent include a silver-palladium alloy. Ag is a noble metal, has a low ionization tendency, is not easily oxidized in the atmosphere, and is easily dissolved by the molten material of the low-melting-point metal layer 1*a*. For this reason, Ag or the alloy containing Ag as a primary constituent is suitably used as the material of the high-melting-point metal layer 1*b*.

The blowout section 1*e* (fuse element 1) can be made, for example, in such a manner that the low-melting-point metal layer Ta is composed of an alloy containing Sn as a primary constituent, the high-melting-point metal layer 1*b* is composed of Ag, and a ratio of the thickness of the low-melting-point metal layer 1*a* to the total thickness of the high-melting-point metal layers 1*b* (low-melting-point metal layer 1*a*:high-melting-point metal layers 1*b*) is 1:1 to 50:1. The blowout section 1*e* has the blowout temperature of 140° C. to 400° C.

The blowout section 1*e* (fuse element 1) has volume resistivity (specific resistance) of about 7.4 μΩ·cm in a case where the low-melting-point metal layer 1*a* is composed of the alloy containing Sn as a primary constituent, the high-melting-point metal layer 1*b* is composed of Ag, and the ratio (low-melting-point metal layer 1*a*:high-melting-point metal layer 1*b*) of the thickness of the low-melting-point metal layer 1*a* to the total thickness of the high-melting-point metal layers 1*b* is 10:1.

The fuse element 1 can be manufactured, for example, using a plating method. Specifically, a metal foil having a shape corresponding to the low-melting-point metal layer 1*a* of the fuse element 1 is prepared, and the high-melting-point metal layer 1*b* is formed on the entire surface of the metal foil using a plating method. With this, the flat plate-shaped fuse element 1 in which the entire surface of the low-melting-point metal layer 1*a* is coated with the high-melting-point metal layer 1*b* having a substantially constant thickness is obtained.

(First Terminal, Second Terminal)

In using the fuse device 10, the first terminal 20*a* and the second terminal 20*b* are joined to terminal sections of an electric circuit (not shown) to be electrically connected to the electric circuit. As shown in FIG. 1(*a*), an attachment hole 3*a* composed of a circular through-hole is provided in a center portion of the first terminal 20*a*. Similarly to the first terminal 20*a*, an attachment hole 3*b* composed of a circular through-hole is provided in a center portion of the second terminal 20*b*. The fuse device 10 of the embodiment is attachably and detachably attached at a predetermined position using joining members, such as bolts, and the attachment holes 3*a* and 3*b*.

As shown in FIG. 1(*a*), widths 2*d* of joining portions joining the first terminal 20*a* and the second terminal 20*b* to the blowout section 1*e* are identical. Planar shapes of the first terminal 20*a* and the second terminal 20*b* are substantially symmetric with the blowout section 1*e* sandwiched therebetween and are substantially symmetric with respect to a center of the blowout section 1*e* in a width 1*d* direction.

The planar shapes of the first terminal 20*a* and the second terminal 20*b* are not limited to the example shown in FIG. 1(*a*). For example, planar shapes of the attachment holes 3*a* and 3*b* are not limited to circular shapes, and may be elliptical shapes, polygonal shapes, and the like. Instead of the attachment holes 3*a* and 3*b*, notches may be provided such that the first terminal 20*a* and the second terminal 20*b* have a C-shape in a plan view. In a case where the widths 2*d* of the joining portions joining the first terminal 20*a* and the second terminal 20*b* to the blowout section 1*e* are identical, the planar shapes of the first terminal 20*a* and the second terminal 20*b* may not be substantially symmetric with the blowout section 1*e* sandwiched therebetween or may not be substantially symmetric with respect to the center of the blowout section 1*e* in the width 1*d* direction.

The first terminal 20*a* and the second terminal 20*b* are formed of a material having conductivity. For example, the first terminal 20*a* and the second terminal 20*b* can be composed of Cu or an alloy containing Cu as a primary constituent. Examples of the alloy containing Cu as a primary constituent include a Cu—Ni alloy.

In the fuse device 10 of the embodiment, as shown in FIG. 1(*a*), the width 1*d* of the blowout section 1*e* in a plan view has a length ($\{1d/2d\}\times100\geq80(\%)$) equal to or greater than 80% of the width 2*d* of each of the joining portions joining the first terminal 20*a* and the second terminal 20*b* to the blowout section 1*e*, is preferably a length equal to or greater than 95% of the width 2*d* of each of the joining portions, and more preferably exceeds 100% of the width 2*d* of each of the joining portions.

In the specification, the width 1*d* of the blowout section 1*e* in a case where the length of the blowout section in the width direction is not constant is a length of a portion having a shortest length in the width direction. The width 2*d* of each of the joining portions joining the first terminal 20*a* and the second terminal 20*b* to the blowout section 1*e* is a length parallel to the width 1*d* of the blowout section 1*e* in each of portions of the first terminal 20*a* and the second terminal 20*b* closest to the blowout section 1*e*.

In a case where the width 1*d* of the blowout section 1*e* is the length equal to or greater than 80% described above, an effect of decreasing the resistance of the blowout section 1*e* due to the large the width 1*d* of the blowout section 1*e* is sufficiently obtained. The width 1*d* of the blowout section 1*e* is preferably equal to or less than 200% of the width 2*d* of each of the joining portions joining the first terminal 20*a* and the second terminal 20*b* to the blowout section 1*e*, and more preferably, equal to or less than 150%. In a case where the width 1*d* of the blowout section 1*e* is the length equal to or less than 200% described above, an influence on a reduction in size of the fuse device 10 can be suppressed due to the excessive width 1*d* of the blowout section 1*e*.

The fuse device 10 shown in FIGS. 1(*a*) and 1(*b*) can be manufactured by a known method. For example, the fuse device 10 can be manufactured by a method in which the fuse element 1 (blowout section 1*e*) is joined to the first terminal 20*a* and the second terminal 20*b* by a conductive connection member, such as solder, to be electrically connected.

The blowout section 1*e* of the fuse device 10 of the embodiment is not blown out while a rated current flows through an electric circuit joined thereto through the first terminal 20*a* and the second terminal 20*b*. In a case where an overcurrent exceeding the rated current flows through the above-described electric circuit, the blowout section 1*e* is blown out, the first terminal 20*a* and the second terminal 20*b* are disconnected, and a current path of the electric circuit is cut off.

In a case where the blowout section 1*e* is formed in such a manner that the low-melting-point metal layer 1*a* and the high-melting-point metal layer 1*b* are laminated in the thickness direction, and in a case where an overcurrent exceeding the rated current flows through the electric circuit, the low-melting-point metal layer 1*a* of the blowout section 1*e* generates heat and is melted, the high-melting-point metal layer 1*b* is dissolved by a generated molten material of the low-melting-point metal layer 1*a*, and the blowout section 1 is quickly blown out.

The fuse device 10 of the embodiment in which the width 1*d* of the blowout section 1*e* is the length equal to or greater than 80% of the width 2*d* of each of the joining portions joining the first terminal 20*a* and the second terminal 20*b* to the blowout section 1*e* has the blowout section 1*e* that has the large width 1*d* and low resistance, and can thus contribute to an increase in rated current.

In a case where the blowout temperature of the blowout section 1*e* in the fuse device 10 of the embodiment is equal to or lower than 400° C., the first terminal 20*a* and the second terminal 20*b* can be prevented from reaching a high temperature at the time of blowout and adversely influencing a member connected to the first terminal 20*a* and the second terminal 20*b*, and an electronic apparatus to which the fuse device 10 is attached can be restrained from exceeding a heat resistance temperature. Accordingly, in a case where the blowout temperature of the blowout section 1*e* is equal to or lower than 400° C., there is no need to provide a plurality of small holes in the blowout section or to thin the width of the blowout section to form a local heat-generating point such that the first terminal 20*a* and the second terminal 20*b* are not excessively heated.

In a case where the blowout temperature of the blowout section 1*e* is equal to or lower than 400° C., there is no need to form a heat-generating point in the blowout section 1*e* and increase the length of the blowout section 1*e* to increase a distance between the heat-generating point and each of the first terminal 20*a* and the second terminal 20*b* such that the first terminal 20*a* and the second terminal 20*b* are not excessively heated. Accordingly, in a case where the blowout temperature of the blowout section 1*e* is equal to or lower than 400° C., the length of the blowout section 1*e* (the distance between the first terminal 20*a* and the second terminal 20*b*) can be reduced, compared to a case where the blowout temperature of the blowout section 1*e* exceeds 400° C.

The length and the resistance value of the blowout section 1*e* (fuse element 1) have a proportional relationship. Accordingly, as the length of the fuse element 1 is reduced, the resistance value of the fuse element 1 decreases. As described above, in a case where the blowout temperature of the blowout section 1*e* is equal to or lower than 400° C., it is possible to reduce the length of the blowout section 1*e*, compared to a case where the blowout temperature of the blowout section 1*e* exceeds 400° C. Thus, it is possible to make the blowout section 1*e* that is small in size and has lower resistance. As a result, the size of the fuse device 10 can be reduced and the rated current can be further increased.

In a case where the blowout temperature of the blowout section 1*e* is equal to or lower than 400° C., the length of the blowout section 1*e* can be reduced. For this reason, the resistance value of the blowout section 1*e* can be decreased and the rated current can be increased even though the blowout section 1*e* is formed of a material having high volume resistivity, for example, compared to a fuse element (volume resistivity 1.62 μΩ·cm) that is composed of copper since the melting point (1085° C.) is high and the blowout temperature of the blowout section exceeds 400° C.

Second Embodiment (Fuse Device)

Figure 2:
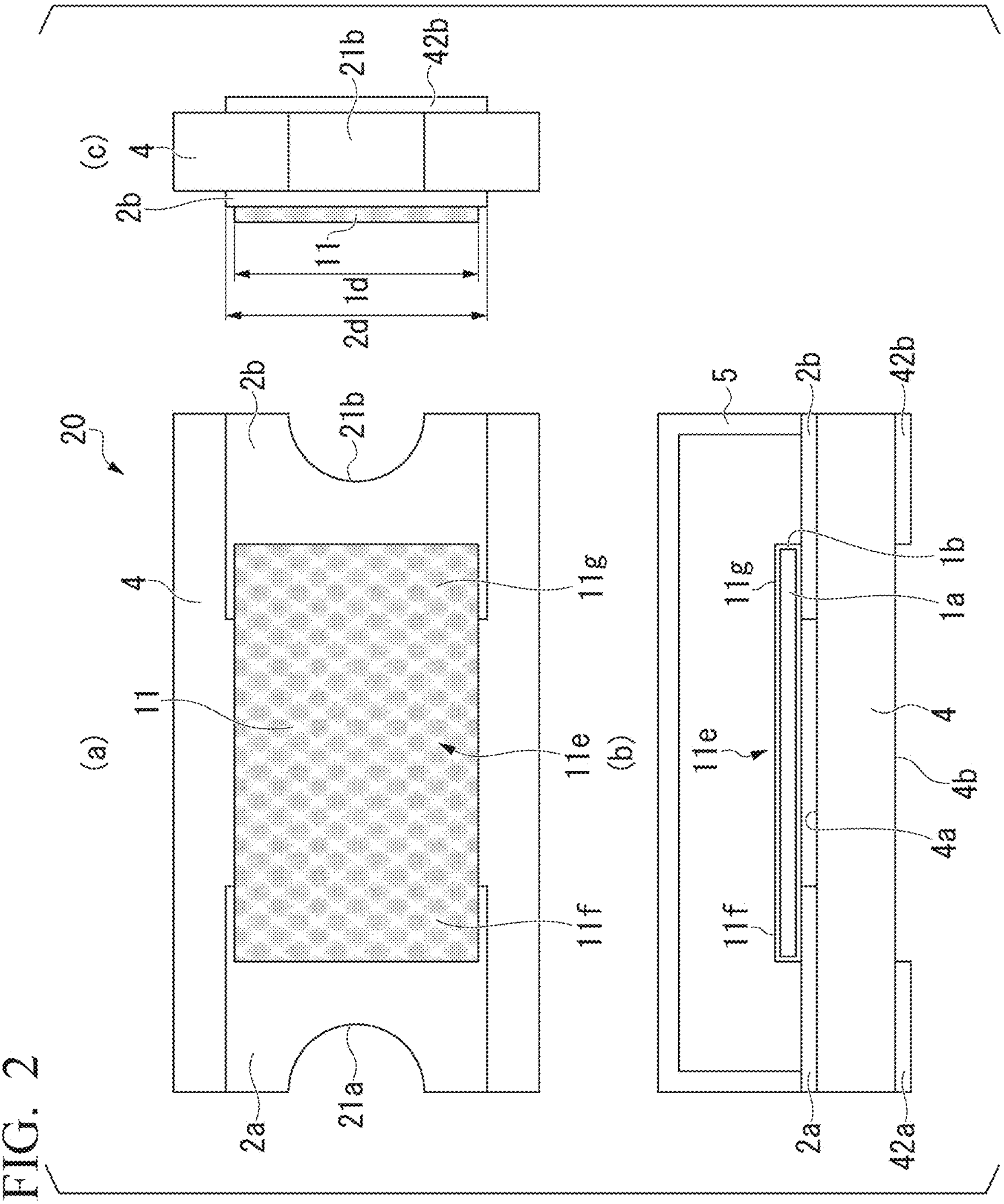
FIG. 2(*a*) is a plan view showing a fuse device of a second embodiment.

FIG. 2(*a*) is a plan view showing a fuse device of a second embodiment. FIG. 2(*b*) is a side view of the fuse device shown in FIG. 2(*a*) from a lower side of FIG. 2(*a*). FIG. 2(*c*) is a side view of the fuse device shown in FIG. 2(*a*) from a right side of FIG. 2(*a*). FIGS. 2(*a*) and 2(*c*) show a state in which a cover member 5 of a fuse device 20 shown in FIG. 2(*b*) is removed.

As shown in FIGS. 2(*a*) to 2(*c*), the fuse device 20 includes a fuse element 11, an insulating substrate 4, and a first electrode 2*a* and a second electrode 2*b* disposed on a front surface 4*a* of the insulating substrate 4. Each of the first electrode 2*a* and the second electrode 2*b* functions as a terminal that is conductively connected to the fuse element 11.

A difference between the fuse element 11 provided in the fuse device 20 of the second embodiment shown in FIGS. 2(*a*) to 2(*c*) and the fuse element 1 provided in the first embodiment is only that, in the fuse element 11 shown in FIGS. 2(*a*) to 2(*c*), side surfaces in a direction connecting the first electrode 2*a* and the second electrode 2*b* are not coated with the high-melting-point metal layer 1*b*, and the low-melting-point metal layer ta is exposed on the side surfaces. Accordingly, the fuse element 11 provided in the fuse device 20 of the second embodiment has the same materials and layer structure as the fuse element 1 provided in the first embodiment. For this reason, the fuse element 11 provided in the second embodiment will be described focusing on only a difference from the fuse element 1 provided in the first embodiment.

In the fuse device 20 of the embodiment, as shown in FIGS. 2(*a*) and 2(*b*), the fuse element 11 has a blowout section 11*e* disposed between the first electrode 2*a* and the second electrode 2*b*, a first joint portion 11*f* joined onto the first electrode 2*a* by a conductive connection member (not shown), such as solder, and a second joint portion 11*g* joined onto the second electrode 2*a* by a conductive connection member (not shown), such as solder. As shown in FIG. 2(*b*), a space is formed between the blowout section 11*e* and the front surface 4*a* of the insulating substrate 4.

In the fuse element 11 provided in the fuse device 20 of the second embodiment, as shown in FIG. 2(*b*), a side surface that is joined to the first electrode 2*a* or the second electrode 2*b* is coated with the high-melting-point metal layer 1*b*. For this reason, leakage of the low-melting-point metal layer 1*a* from the blowout section 11*e* or inflow of the conductive connection member, such as solder, into the blowout section 11*e* due to heating at the time of reflow in a manufacturing process of the fuse device 20 is suppressed. As a result, fluctuation of the resistance value of the blowout section 11*e* due to deformation of the blowout section 11*e* (fuse element 11) at the time of the reflow in the manufacturing process of the fuse device 20 is suppressed, and the fuse device 20 having stable blowout characteristics can be easily manufactured.

The fuse element 11 can be manufactured, for example, using an electroless plating method. Specifically, a band-shaped (ribbon-shaped) metal foil that will become the low-melting-point metal layer 1*a* is prepared. As the metal foil, a metal foil having a width corresponding to the length of the low-melting-point metal layer 1*a* of the fuse element 11 in the direction connecting the first electrode 2*a* and the second electrode 2*b* is used. Next, the high-melting-point metal layer 1*b* is formed on the surface of the metal foil using an electroless plating method, and a band-shaped laminate is obtained. Thereafter, the length of the band-shaped laminate is cut at a predetermined dimension to be made into a flat plate shape. With this, the fuse element 11 that has a predetermined rectangular shape and in which the low-melting-point metal layer 1*a* is exposed on cut sections is obtained. This manufacturing method is particularly suitable for a case of manufacturing a small-sized fuse element.

Even in the fuse device 20 of the embodiment, as in the first embodiment, as shown in FIG. 2(*c*), a width 1*d* of the blowout section 11*e* in the plan view has a length ($\{1d/2d\}\times100\geq80(\%)$) equal to or greater than 80% of a width 2*d* of each of joining portions joining the first electrode 2*a* and the second electrode 2*b* to the blowout section 11*e*, is preferably a length equal to or greater than 95% of the width 2*d* of each of the joining portions, and is more preferably a length exceeding 100% of the width 2*d* of each of the joining portions.

In the fuse element 11 provided in the fuse device 20 of the embodiment, the low-melting-point metal layer 1*a* is exposed on the side surfaces in the direction connecting the first electrode 2*a* and the second electrode 2*b*. That is, the low-melting-point metal layer 1*a* is exposed on the surfaces of the fuse element 11 in a direction substantially perpendicular to the direction connecting the first electrode 2*a* and the second electrode 2*b*. For this reason, the width 1*d* of the blowout section 11*e* in a plan view is more preferably a length exceeding 100% of the width 2*d* of the joining portion joining the first electrode 2*a* or the second electrode 2*b* to the blowout section 11*e* (the width 1*d* is greater than the width 2*d*) for the following reason. It is possible to more effectively suppress the contact of the conductive connection member, such as solder, and the low-melting-point metal layer 1*a* of the fuse element 11 at the time of the reflow in the manufacturing process of the fuse device 20 with the high-melting-point metal layer 1*b* with which the side surfaces of the fuse element 11 joined to the first electrode 2*a* and the second electrode 2*b* are coated. As a result, fluctuation of the resistance value of the blowout section 11*e* due to deformation of the blowout section 11*e* (fuse element 11) at the time of the reflow is suppressed, and the fuse device 20 having stable blowout characteristics can be easily manufactured.

The insulating substrate 4 is not particularly limited as long as the insulating substrate has electrical insulation, and, for example, a known insulating substrate that is used as a circuit board, such as a resin substrate, a ceramic substrate, or a composite substrate of a resin and a ceramic can be used. Specific examples of the resin substrate include an epoxy resin substrate, a phenol resin substrate, and a polyimide substrate. Specific examples of the ceramic substrate include an alumina substrate, a glass ceramic substrate, a mullite substrate, and a zirconia substrate. Specific examples of the composite substrate include a glass epoxy substrate.

The first electrode 2*a* and the second electrode 2*b* are disposed at a pair of facing end portions of the insulating substrate 4. Each of the first electrode 2*a* and the second electrode 2*b* is formed of a conductive pattern, such as Ag wiring or Cu wiring.

Each of the surfaces of the first electrode 2*a* and the second electrode 2*b* may be coated with an electrode protection layer to suppress changes in electrode characteristics due to oxidation or the like. As a material of the electrode protection layer, a Sn-plated film, a Ni/Au-plated film, a Ni/Pd-plated film, a Ni/Pd/Au-plated film, or the like can be used.

The first electrode 2*a* and the second electrode 2*b* are electrically connected to a first external connection electrode 42*a* and a second external connection electrode 42*b* formed on a rear surface 4*b* of the insulating substrate 4 through castellations 21*a* and 21*b*, respectively. The connection of the first electrode 2*a* and the first external connection electrode 42*a* and the connection of the second electrode 2*b* and the second external connection electrode 42*b* may be performed through through-holes.

In the fuse device 20 of the embodiment, as shown in FIG. 2(*b*), the cover member 5 is preferably attached through an adhesive. With the attachment of the cover member 5, the inside of the fuse device 20 is protected, and scattering of a molten material generated in a case where the fuse element 11 is blown out can be prevented. As a material of the cover member 5, various engineering plastics and/or ceramics can be used.

The fuse device 20 of the embodiment is mounted on a current path of the circuit board (not shown) through the first external connection electrode 42*a* and the second external connection electrode 42*b* for use. While a rated current is flowing to the current path of the circuit board, the blowout section 11*e* of the fuse element 11 provided in the fuse device 20 is not blown out. In a case where an overcurrent exceeding the rated current flows through the current path of the circuit board, the blowout section 11*e* is blown out, whereby the first electrode 2*a* and the second electrode 2*b* are disconnected and the current path of the circuit board is cut off.

In a case where the blowout section 11*e* is formed in such a manner that the low-melting-point metal layer 1*a* and the high-melting-point metal layer 1*b* are laminated in the thickness direction, and in a case where the overcurrent exceeding the rated current flows through the current path of the circuit board, the low-melting-point metal layer 1*a* of the blowout section 11*e* generates heat to be melted, the high-melting-point metal layer 1*b* is dissolved by a generated molten material of the low-melting-point metal layer 1*a*, and the blowout section 11*e* is quickly blown out.

Similarly to the fuse device 10 of the first embodiment, the fuse device 20 of the embodiment in which the width 1*d* of the blowout section 11*e* is the length equal to or greater than 80% of the width 2*d* of each of the joining portions joining the first electrode 2*a* and the second electrode 2*b* to the blowout section 11*e* has the blowout section 11*e* that has the large width 1*d* and low resistance, and can thus contribute to an increase in rated current.

In a case where the blowout temperature of the blowout section 11*e* in the fuse device 20 of the embodiment is equal to or lower than 400° C., first electrode 2*a* and the second electrode 2*b* can be restrained from reaching a high temperature at the time of blowout and adversely influencing a member connected to the first electrode 2*a* and the second electrode 2*b*, and the circuit board to which the first external connection electrode 42*a* and the second external connection electrode 42*b* are connected. Accordingly, the length of the blowout section 11*e* (the distance between the first electrode 2*a* and the second electrode 2*b*) can be reduced, the size of the fuse device 20 can be reduced, and the rated current can be further increased, compared to a case where the blowout temperature of the blowout section 11*e* exceeds 400° C.

Third Embodiment (Fuse Device)

Figure 3:
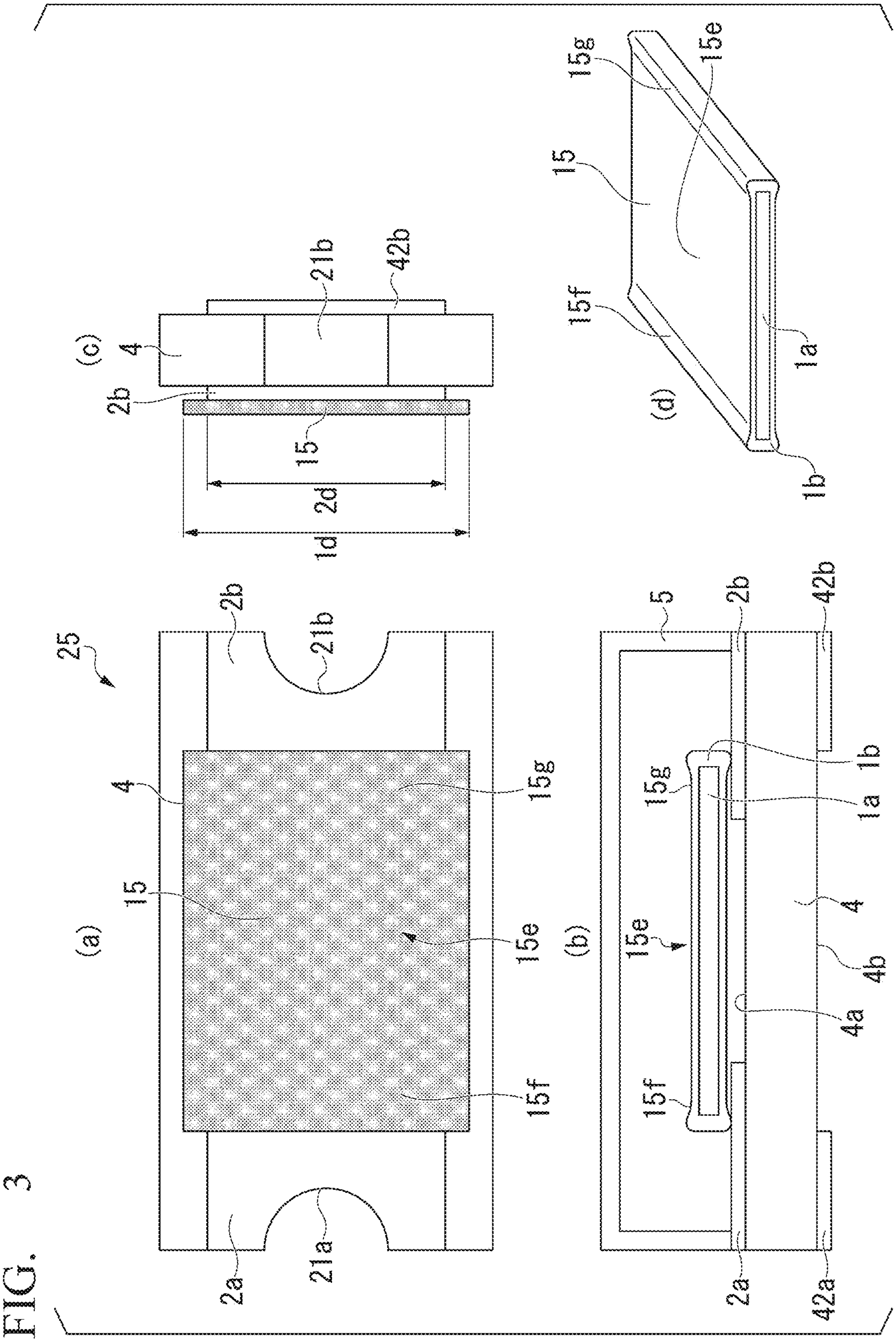
FIG. 3(*a*) is a plan view of a fuse device of a third embodiment.

FIG. 3(*a*) is a plan view showing a fuse device of a third embodiment. FIG. 3(*b*) is a side view of the fuse device shown in FIG. 3(*a*) from a lower side of FIG. 3(*a*). FIG. 3(*c*) is a side view of the fuse device shown in FIG. 3(*a*) from a right side of FIG. 3(*a*). FIGS. 3(*a*) and 3(*c*) show a state in which a cover member 5 of a fuse device 25 shown in FIG. 3(*b*) is removed. FIG. 3(*d*) is a perspective view showing a fuse element provided in the fuse device shown in FIG. 3(*a*).

As shown in FIGS. 3(*a*) to 3(*c*), the fuse device 25 includes a fuse element 15 shown in FIG. 3(*d*), an insulating substrate 4, and a first electrode 2*a* and a second electrode 2*b* disposed on a front surface 4*a* of the insulating substrate 4. As in the second embodiment, each of the first electrode 2*a* and the second electrode 2*b* functions as a terminal that is conductively connected to the fuse element 15.

A difference between the fuse device 25 of the third embodiment shown in FIGS. 3(*a*) to 3(*c*) and the fuse device 20 shown in the second embodiment is only a thickness (shape) of high-melting-point metal layer 1*b* in a first joint portion 15*f* and a second joint portion 15*g* of the fuse element 15 provided in the fuse device 25 shown in FIG. 3(*a*) to FIG. 3(*c*). Accordingly, in the third embodiment, description will be provided focusing on only a difference from the second embodiment, and the same members as those in the second embodiment are represented by the same reference numerals and description thereof will not be repeated.

In the fuse element 15 provided in the fuse device 25 of the third embodiment, as shown in FIGS. 3(*b*) and 3(*d*), the thickness of the high-melting-point metal layer 1*b* in the first joint portion 15*f* and the second joint portion 15*g* is greater than that in the blowout section 15*e*. This gives a cut section of the fuse element 15 shown in FIGS. 3(*b*) and 3(*d*) a dog-bone shape. The first joint portion 15*f* is a portion that is joined to the first electrode 2*a* by a conductive connection member (not shown), such as solder. The second joint portion 15*g* is a portion that is joined to the second electrode 2*b* by a conductive connection member (not shown), such as solder. For this reason, in the fuse device 25 of the third embodiment, it is possible to effectively suppress the contact of the conductive connection member, such as solder, and the low-melting-point metal layer 1*a* of the fuse element 15 at the time of reflow in a manufacturing process of the fuse device 25, with the high-melting-point metal layer 1*b* that forms the first joint portion 15*f* and the second joint portion 15*g*. As a result, fluctuation of a resistance value of the blowout section 15*e* due to deformation of the blowout section 15*e* (fuse element 15) at the time of the reflow is more effectively suppressed, and the fuse device 25 having stable blowout characteristics can be easily manufactured. As shown in FIG. 3(*c*), the width 1*d* of the blowout section 15*e* in a plan view has a length greater than 100% and equal to or less than 200% of the width 2*d* of each of the joining portions joining the first electrode 2*a* and the second electrode 2*b* to the blowout section 15*e*. With this width relationship, when the fuse element 15 is joined to the first electrode 2*a* and the second electrode 2*b* by a conductive connection member such as solder, contact between the solder and the low-melting-point metal layer 1*a* does not occur. As shown in FIGS. 3(*b*) and 3(*d*), the thickness of the high-melting-point metal layer 1*b* in the first joint portion 15*f* and the second joint portion 15*g* is greater than that in the blowout section 15*e*, which further prevents contact between the solder and the low-melting-point metal layer 1*a*. As shown in FIG. 3(*d*), the low-melting-point metal layer 1*a* is exposed on the side surfaces in the direction connecting the first electrode 2*a* and the second electrode 2*b*. This configuration effectively prevents leakage of the low-melting-point metal layer 1*a* from the blowout section 15*e* and inflow of the conductive connection member into the blowout section 15*e* during reflow in the manufacturing process.

The fuse element 15 can be manufactured, for example, using an electroplating method. Specifically, a band-shaped (ribbon-shaped) metal foil that will become the low-melting-point metal layer 1*a* is prepared. As the metal foil, a metal foil having a width corresponding to a length of the low-melting-point metal layer 1*a* of the fuse element 15 in a direction connecting the first electrode 2*a* and the second electrode 2*b* is used. Next, the high-melting-point metal layer 1*b* is formed on the surface of the metal foil using the electroplating method, and a band-shaped laminate is obtained. Thereafter, the length of the band-shaped laminate is cut at a predetermined dimension to be made into a flat plate shape. With this, the fuse element 15 that has a predetermined rectangular shape and in which the low-melting-point metal layer 1*a* is exposed on the cut sections is obtained.

In the embodiment, the high-melting-point metal layer 1*b* is formed to be thicker in end portions in a width direction than in a center portion in the width direction of the band-shaped metal foil due to current concentration at the time of electroplating processing. For this reason, as shown in FIG. 3(*d*), the fuse element 15 has a cut section in a dog-bone shape in which the thickness of the high-melting-point metal layer 1*b* of each of the first joint portion 15*f* and the second joint portion 15*g* is greater than that in the blowout section 15*e*. This manufacturing method is particularly suitable for a case of manufacturing a small-sized fuse element.

In the fuse device 25 of the embodiment, as in the first embodiment and the second embodiment, as shown in FIG. 3(*c*), a width 1*d* of the blowout section 15*e* in a plan view is preferably a length ($\{1d/2d\}\times100\geq80(\%)$) equal to or greater than 80% of a width 2*d* of each of joining portions joining the first electrode 2*a* and the second electrode 2*b* to the blowout section 15*e*, is preferably is a length equal to or greater than 95% of the width 2*d* of each of the joining portions, and more preferably exceeds 100% of the width 2*d* of each of the joining portions.

In the fuse element 15 provided in the fuse device 25 of the embodiment, the low-melting-point metal layer 1*a* is exposed on the side surfaces in the direction connecting the first electrode 2*a* and the second electrode 2*b*. For this reason, as in the second embodiment, the width 1*d* of the blowout section 15*e* in a plan view is more preferably a length exceeding 100% of the width 2*d* of each of the joining portions joining the first electrode 2*a* and the second electrode 2*b* to the blowout section 15*e*.

Similarly to the fuse devices of the first embodiment and the second embodiment, the fuse device 25 of the embodiment in which the width 1*d* of the blowout section 15*e* is the length equal to or greater than 80% of the width 2*d* of each of the joining portions joining the first electrode 2*a* and the second electrode 2*b* to the blowout section 15*e* has the blowout section 15*e* that has the large width 1*d* and low resistance, and can thus contribute to an increase in rated current.

In a case where a blowout temperature of the blowout section 11*e* in the fuse device 25 of the embodiment is equal to or lower than 400° C., the first electrode 2*a* and the second electrode 2*b* can be prevented from reaching a high temperature at the time of blowout and adversely influencing a member connected to the first electrode 2*a* and the second electrode 2*b*, and the circuit board to which the first external connection electrode 42*a* and the second external connection electrode 42*b* are connected. Accordingly, the length of the blowout section 11*e* (the distance between the first electrode 2*a* and the second electrode 2*b*) can be reduced, the size of the fuse device 25 can be reduced, and the rated current can be increased, compared to a case where the blowout temperature of the blowout section 11*e* exceeds 400° C.

Fourth Embodiment (Fuse Device)

Figure 4:
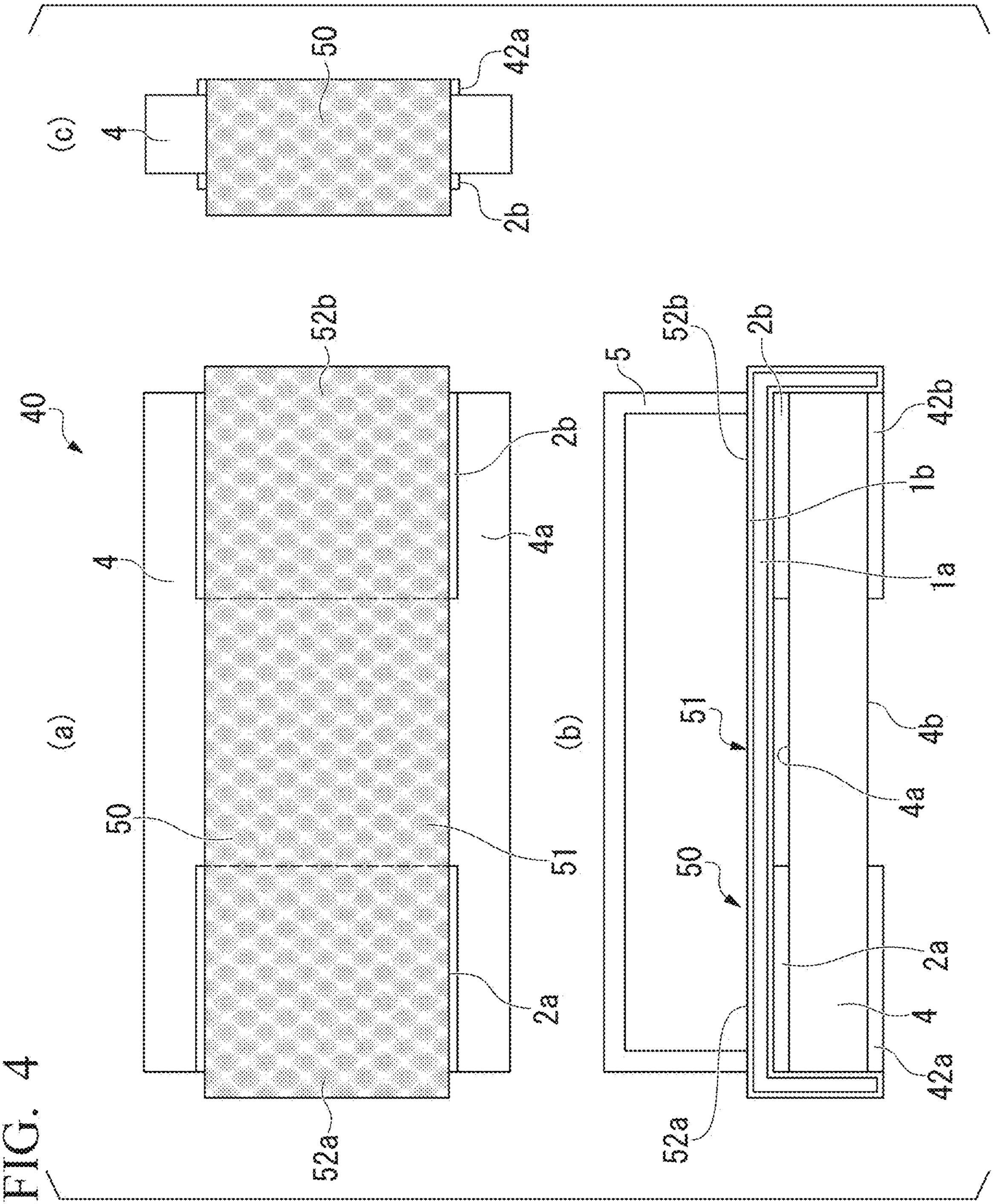
FIG. 4(*a*) is a plan view showing a fuse device of a fourth embodiment.

FIG. 4(*a*) is a plan view showing a fuse device of a fourth embodiment. FIG. 4(*b*) is a side view of the fuse device shown in FIG. 4(*a*) from a lower side of FIG. 4(*a*). FIG. 4(*c*) is a side view of the fuse device shown in FIG. 4(*a*) from a right side of FIG. 4(*a*). FIGS. 4(*a*) and 4(*c*) show a state in which a cover member 5 of a fuse device 40 shown in FIG. 4(*b*) is removed.

As shown in FIGS. 4(*a*) to 4(*c*), the fuse device 40 includes a fuse element 50, an insulating substrate 4, and a first electrode 2*a* and a second electrode 2*b* disposed on a front surface 4*a* of the insulating substrate 4.

In the fourth embodiment, as the fuse element 50, the same fuse element as the fuse element 11 provided in the second embodiment is provided. In other words, the configuration of a cross section of the fuse element 50 perpendicular to an in-plane direction of the insulating substrate 4 of the fuse device 40 shown in FIG. 4(*a*) is the same as the configuration of a cross section of the fuse element 20 perpendicular to an in-plane direction of the insulating substrate 4 of the fuse device 20 shown in FIG. 2(*a*). For this reason, in the fourth embodiment, description of the blowout temperature, the materials, and the layer structure of the fuse element 50 will not be repeated.

As shown in FIGS. 4(*a*) and 4(*b*), the fuse element 50 provided in the fuse device 40 of the embodiment has a blowout section 51 disposed between the first electrode 2*a* and the second electrode 2*b*, a first joint portion 52*a* joined onto the first electrode 2*a* by a conductive connection member (not shown), such as solder, and a second joint portion 52*b* joined onto the second electrode 2*b* by a conductive connection member (not shown), such as solder. As shown in FIG. 4(*b*), a space is formed between the blowout section 51 and the front surface 4*a* of the insulating substrate 4.

In the embodiment, as shown in FIG. 4(*b*), the fuse element 50 is continuously covered from the top of the first electrode 2*a* and the second electrode 2*b* over the side surfaces of the insulating substrate 4. With this, the first electrode 2*a* and the second electrode 2*b* are electrically connected to a first external connection electrode 42*a* and a second external connection electrode 42*b* disposed on a rear surface 4*b* of the insulating substrate 4 through the fuse element 50.

In the embodiment, the first joint portion 52*a* is electrically connected to the first external connection electrode 42*a*, and functions as a terminal that is conductively connected to the blowout section 51 of the fuse element 50. The second joint portion 52*b* is electrically connected to the second external connection electrode 42*b*, and functions as a terminal that is conductively connected to the blowout section 51 of the fuse element 50.

In the fuse device 40 of the embodiment, since the first joint portion 52*a* and the second joint portion 52*b* composed of a part of the band-shaped fuse element 50 function as terminals, a width of the blowout section 51 in a plan view is identical to a width of each of the first joint portion 52*a* and the second joint portion 52*b*. Therefore, the width of the blowout section 51 in a plan view has a length of 100% of a width of each of joining portions joining the first joint portion 52*a* and the second joint portion 52*b* to the blowout section 51.

In the fuse device 40 of the embodiment, the insulating substrate 4, the first electrode 2*a*, the second electrode 2*b*, the first external connection electrode 42*a*, and the second external connection electrode 42*b* that are the same as those in the fuse device 20 of the second embodiment can be used.

Similarly to the fuse device 20 of the second embodiment, as shown in FIG. 4(*b*), the cover member 5 is preferably attached to the fuse device 40 of the embodiment through an adhesive. As a material of the cover member 5, the same material as in the fuse device 20 of the second embodiment can be used.

The fuse device 40 of the embodiment is mounted on a current path of a circuit board (not shown) through the first external connection electrode 42*a* and the second external connection electrode 42*b* for use. In a case where an overcurrent exceeding a rated current flows through the current path of the circuit board, the blowout section 51 is blown out, whereby the first electrode 2*a* and the second electrode 2*b* are disconnected and the current path of the circuit board is cut off.

In a case where the blowout section 51 is formed in such a manner that a low-melting-point metal layer 1*a* and high-melting-point metal layer 1*b* are laminated in a thickness direction, and in a case where the overcurrent exceeding the rated current flows through the current path of the circuit board, the low-melting-point metal layer 1*a* of the blowout section 51 generates heat and is melted, the high-melting-point metal layer 1*b* is dissolved by a generated molten material of the low-melting-point metal layer 1*a*, and the blowout section 51 is quickly blown out.

The fuse device 40 of the embodiment in which the width of the blowout section 51 is the length of 100% of the width of each of the joining portions joining the first joint portion 52*a* and the second joint portion 52*b* to the blowout section 51 has the blowout section 51 that has a large width and low resistance, and can thus contribute to an increase in rated current.

In a case where a blowout temperature of the blowout section 51 in the fuse device 40 of the embodiment is equal to or lower than 400° C., the first electrode 2*a* and the second electrode 2*b* can be restrained from reaching a high temperature at the time of blowout and adversely influencing a member connected to the first electrode 2*a* and the second electrode 2*b*, and the circuit board to which the first external connection electrode 42*a* and the second external connection electrode 42*b* are connected. Accordingly, the length of the blowout section 51 (the distance between the first joint portion 52*a* and the second joint portion 52*b*) can be reduced, the size of the fuse device 40 can be reduced, and the rated current can be further increased, compared to a case where the blowout temperature of the blowout section 51 exceeds 400° C.

Fifth Embodiment (Protection Device)

Figure 5:
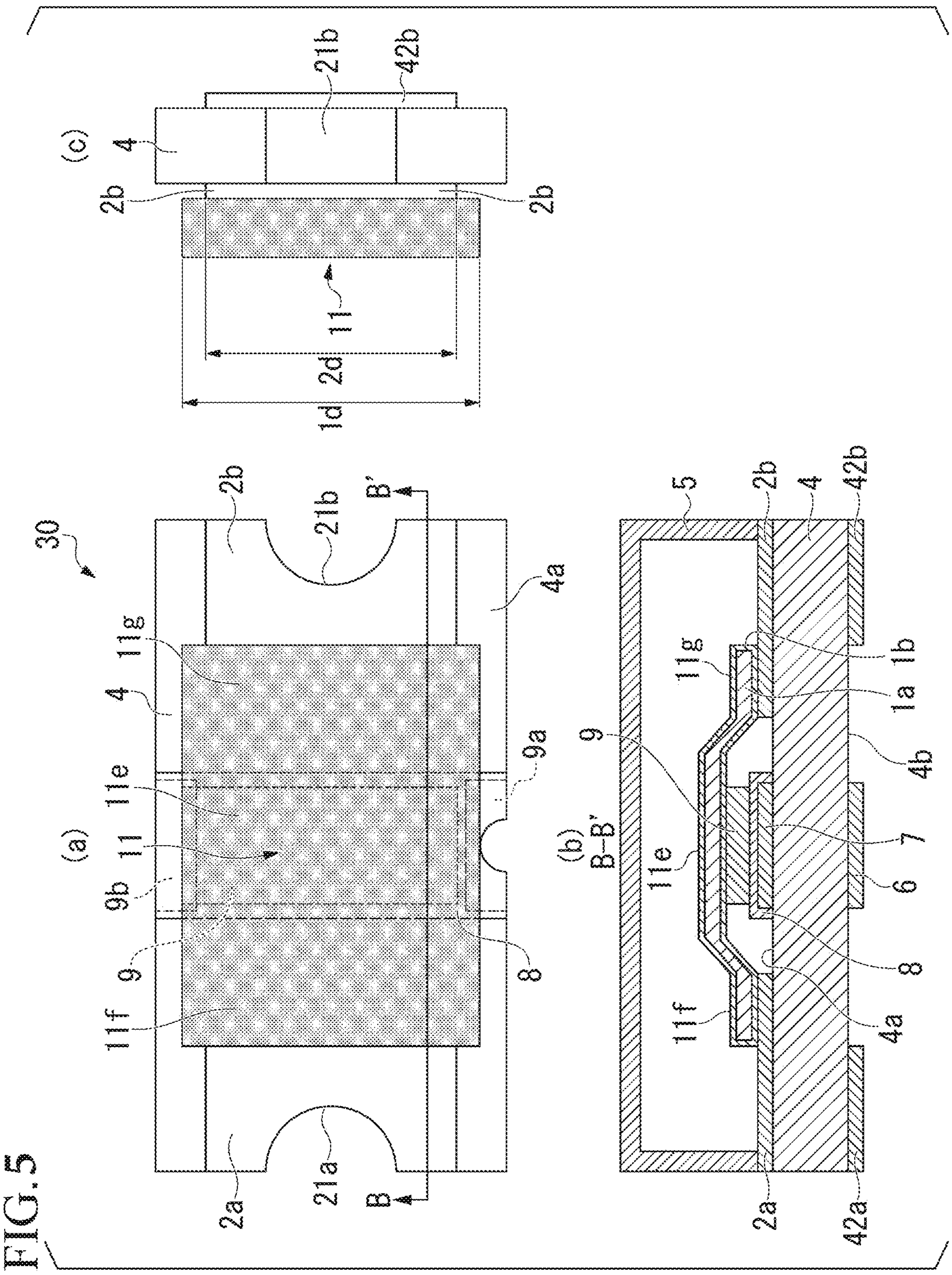
FIG. 5(*a*) is a plan view showing a protection device of a fifth embodiment.

FIG. 5(*a*) is a plan view of a protection device of a fifth embodiment. FIG. 5(*b*) is a sectional view along the line B-B' of the protection device shown in FIG. 5(*a*). FIG. 5(*c*) is a side view of the protection device shown in FIG. 5(*a*) from a right side of FIG. 5(*a*). FIGS. 5(*a*) and 5(*c*) show a state in which a cover member 5 of a protection device 30 shown in FIG. 5(*b*) is removed.

As shown in FIGS. 5(*a*) to 5(*c*), the protection device 30 includes a fuse element 11, a heat-generating element 7 that heats the fuse element 11 to be blown out, an insulating substrate 4, and a first electrode 2*a* and a second electrode 2*b* disposed on a front surface 4*a* of the insulating substrate 4. In the protection device 30 of the embodiment, as shown in FIG. 5(*b*), the fuse element 11 is disposed across the first electrode 2*a* and the second electrode 2*b*. That is, the fuse element 11 spans from the first electrode 2*a* to the second electrode 2*b*. Each of the first electrode 2*a* and the second electrode 2*b* functions as a terminal that is conductively connected to the fuse element 11. The protection device 30 of the embodiment has a first heat-generating element electrode 9*a* and a second heat-generating element electrode 9*b* that are connected to the heat-generating element 7, and a heat-generating element lead-out electrode 9 that is connected to the second heat-generating element electrode 9*b*.

The protection device 30 of the fifth embodiment includes, as the fuse element 11, the insulating substrate 4, the first electrode 2*a*, and the second electrode 2*b*, the same ones provided in the fuse device 20 of the second embodiment. For this reason, in the fifth embodiment, description of the blowout temperature, the materials, and the layer structure of the fuse element 11 will not be repeated. In the fifth embodiment, description of the insulating substrate 4, the first electrode 2*a*, and the second electrode 2*b* will not be repeated.

In the protection device 30 of the embodiment, as shown in FIGS. 5(*a*) and 5(*b*), the fuse element 11 has a blowout section 11*e* disposed between the first electrode 2*a* and the second electrode 2*b*, a first joint portion 11 joined onto the first electrode 2*a* by a conductive connection member (not shown), such as solder, and a second joint portion 11*g* joined onto the second electrode 2*b* by a conductive connection member (not shown), such as solder.

In the protection device 30 of the embodiment, as shown in FIG. 5(*b*), a surface of the blowout section 11*e* on the insulating substrate 4 side and the heat-generating element lead-out electrode 9 are electrically connected. The blowout section 11*e* and the heat-generating element lead-out electrode 9 are electrically connected by a conductive connection member (not shown), such as solder.

In the protection device 30 of the embodiment, as shown in FIG. 5(*b*), the blowout section 11*e* is in a protruding shape on an opposite side to the front surface 4*a* of the insulating substrate 4 in sectional view. Further, the heat-generating element 7 disposed on the front surface 4*a* of the insulating substrate 4, an insulating member 8 with which the heat-generating element 7 is coated, and the heat-generating element lead-out electrode 9 formed on the heat-generating element 7 through the insulating member 8 are disposed between the blowout section 11*e* and the front surface 4*a* of the insulating substrate 4.

The heat-generating element 7 is formed of a high-resistance conductive material that has comparatively high resistance and generates heat with electrical conduction provided thereto. Examples of the high-resistance conductive material include materials containing nichrome, V, Mo, and Ru. The heat-generating element 7 can be formed by, for example, a method of forming a pattern with a substance in a paste obtained by mixing the above-described high-resistance conductive material, a resin binder, and the like, on the front surface 4*a* of the insulating substrate 4 using a screen printing technique and baking the pattern.

The insulating member 8 is formed of an insulating material, such as glass. The heat-generating element lead-out electrode 9 is disposed to face the heat-generating element 7 through the insulating member 8. With this, the heat-generating element 7 is superimposed on the blowout section 11*e* of the fuse element 11 through the insulating member 8 and the heat-generating element lead-out electrode 9. With such a superimposed structure, it is possible to allow heat generated by the heat-generating element 7 to be efficiently transmitted to the blowout section 11*e*.

Even in the protection device 30 of the embodiment, similarly to the fuse device 20 of the second embodiment, as shown in FIG. 5(*c*), a width 1*d* of the blowout section 11*e* in a plan view has a length ({1*d*/2*d*}×100≥80(%)) equal to or greater than 80% of a width 2*d* of each of joining portions joining the first electrode 2*a* and the second electrode 2*b* to the blowout section 11*e*, is preferably a length equal to or greater than 95% of the width 2*d* of each of the joining portions, and more preferably exceeds 100% of the width 2*d* of each of the joining portions.

Similarly to the fuse device 20 of the second embodiment, as shown in FIG. 5(*b*), a cover member 5 is preferably attached to the protection device 30 of the embodiment through an adhesive. As a material of the cover member 5, the same material as in the fuse device 20 of the second embodiment can be used.

As shown in FIG. 5(*a*), the first electrode 2*a* and the second electrode 2*b* are disposed in a pair of facing end portions on the front surface 4*a* of the insulating substrate 4. The first heat-generating element electrode 9*a* and the second heat-generating element electrode 9*b* are disposed in another pair of facing end portions on the front surface 4*a* of the insulating substrate 4.

Each of the first electrode 2*a*, the second electrode 2*b*, the first heat-generating element electrode 9*a*, the second heat-generating element electrode 9*b*, and the heat-generating element lead-out electrode 9 is formed with a conductive pattern of Ag wiring, Cu wiring, or the like.

Each of the first electrode 2*a*, the second electrode 2*b*, the first heat-generating element electrode 9*a*, the second heat-generating element electrode 9*b*, and the heat-generating element lead-out electrode 9 may be coated with an electrode protection layer to suppress changes in electrode characteristics due to oxidation or the like. As a material of the electrode protection layer, a Sn-plated film, a Ni/Au-plated film, a Ni/Pd-plated film, a Ni/Pd/Au-plated film, or the like can be used.

In the protection device 30 of the embodiment, the first electrode 2*a*, the second electrode 2*b*, and the first heat-generating element electrode 9*a* are electrically connected to the first external connection electrode 42*a*, the second external connection electrode 42*b*, and the heat-generating element power feed electrode 6 formed on a rear surface 4*b* of the insulating substrate 4 through castellations, respectively. The connection of the first electrode 2*a* and the first external connection electrode 42*a*, the connection of the second electrode 2*b* and the second external connection electrode 42*b*, and the connection of the first heat-generating element electrode 9*a* and the heat-generating element power feed electrode 6 may be performed through through-holes. The connection of the second heat-generating element electrode 9*b* and the heat-generating element lead-out electrode 9 can be performed by a known method, such as one using a through-hole (not shown).

In the protection device 30 of the embodiment, an electrical conduction path to the heat-generating element power feed electrode 6, the first heat-generating element electrode 9*a*, the heat-generating element 7, the second heat-generating element electrode 9*b*, the heat-generating element lead-out electrode 9, and the blowout section 11*e* of the fuse element 11, and an electrical conduction path to the first external connection electrode 42*a*, the first electrode 2*a*, the blowout section 11*e*, the second electrode 2*b*, and the second external connection electrode 42*b* are formed.

The protection device 30 of the embodiment is mounted on a current path of a circuit board (not shown) through the first external connection electrode 42*a*, the second external connection electrode 42*b*, and the heat-generating element power feed electrode 6 for use. With this, for example, the blowout section 11*e* of the protection device 30 is connected to the current path of the circuit board through the first external connection electrode 42*a* and the second external connection electrode 42*b*, and the heat-generating element 7 is connected to a current control device provided on the circuit board through the heat-generating element power feed electrode 6.

In the protection device 30 of the embodiment, in a case where an abnormality occurs in the circuit board, electrical conduction is provided to the heat-generating element 7 through the heat-generating element power feed electrode 6 by the current control device provided on the circuit board. With this, the heat-generating element 7 generates heat, the blowout section 11*e* is heated through the insulating member 8 and the heat-generating element lead-out electrode 9, and the blowout section 11*e* is blown out. With this, the first electrode 2*a* and the second electrode 2*b* are disconnected, and the current path of the circuit board is cut off.

In a case where the blowout section 1*e* is formed in such a manner that a low-melting-point metal layer 1*a* and high-melting-point metal layer 1*b* are laminated in a thickness direction, and in a case where electrical conduction is provided to the heat-generating element 7 by the current control device provided on the circuit board, the low-melting-point metal layer 1*a* of the blowout section 11*e* is heated and melted, the high-melting-point metal layer 1*b* is dissolved by a generated molten material of the low-melting-point metal layer 1*a*, and the blowout section 11*e* is quickly blown out.

Similarly to the fuse device 20 of the second embodiment, the protection device 30 of the embodiment in which the width 1*d* of the blowout section 11*e* is the length equal to or greater than 80% of the width 2*d* of each of the joining portions joining the first electrode 2*a* and the second electrode 2*b* to the blowout section 11*e* has the blowout section 11*e* that has the large width 1*d* and low resistance, and can thus contribute to an increase in rated current.

In a case where a blowout temperature of the blowout section 11*e* in the protection device 30 of the embodiment is equal to or lower than 400° C., the first electrode 2*a* and the second electrode 2*b* can be restrained from reaching a high temperature at the time of blowout and adversely influencing a member connected to the first electrode 2*a* and the second electrode 2*b*, and the circuit board to which the first external connection electrode 42*a* and the second external connection electrode 42*b* are connected. Accordingly, the length of the blowout section 11*e* (the distance between the first electrode 2*a* and the second electrode 2*b*) can be reduced, the size of the protection device 30, and a rated current can be further increased, compared to a case where the blowout temperature of the blowout section 11*e* exceeds 400° C.

Sixth Embodiment (Protection Device)

Figure 6:
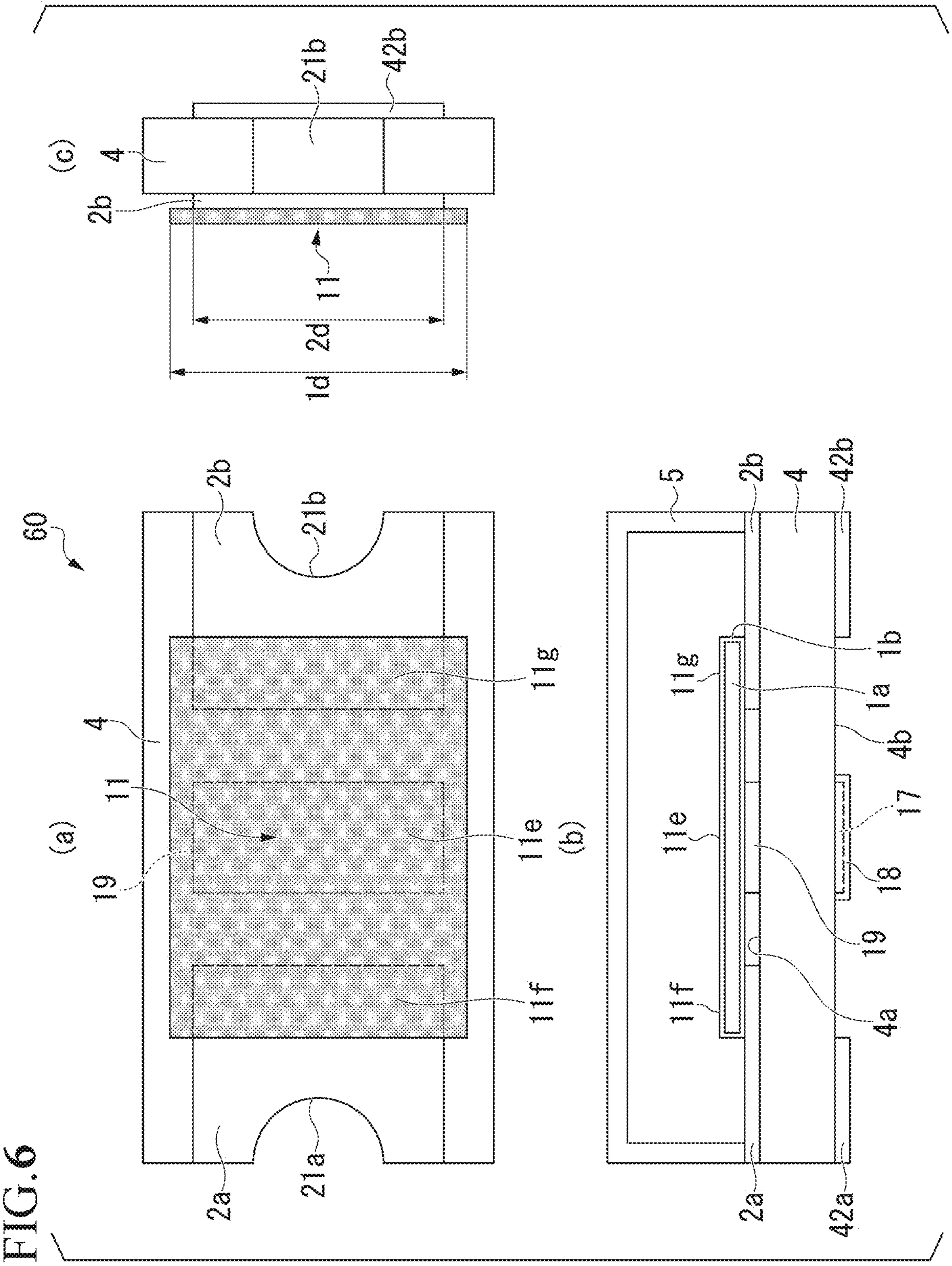
FIG. 6(*a*) is a plan view showing a protection device of a sixth embodiment.

FIG. 6(*a*) is a plan view showing a protection device of a sixth embodiment. FIG. 6(*b*) is a side view of the protection device shown in FIG. 6(*a*) from a lower side of FIG. 6(*a*). FIG. 6(*c*) is a side view of the protection device shown in FIG. 6(*a*) from a right side of FIG. 6(*a*). FIGS. 6(*a*) and 6(*c*)

show a state in which a cover member 5 of a protection device 60 shown in FIG. 6(*b*) is removed.

As shown in FIGS. 6(*a*) to 6(*c*), the protection device 60 includes a fuse element 11, a heat-generating element 17 that heats the fuse element 11 to be blown out, an insulating substrate 4, and a first electrode 2*a* and a second electrode 2*b* disposed on a front surface 4*a* of the insulating substrate 4. In the protection device 60 of the embodiment, as shown in FIG. 6(*b*), the fuse element 11 is disposed across the first electrode 2*a* and the second electrode 2*b*. That is, the fuse element 11 spans from the first electrode 2*a* to the second electrode 2*b*. Each of the first electrode 2*a* and the second electrode 2*b* functions as a terminal that is conductively connected to the fuse element 11. The protection device 60 of the embodiment has a heat-generating element lead-out electrode 19 that is connected to the heat-generating element 17.

A difference between the protection device 60 of the sixth embodiment and the protection device 30 of the fifth embodiment is only the shape of the blowout section 11*e*, the disposition of the heat-generating element 17 and an insulating member 18, and the disposition of wiring connected to the heat-generating element 17. Accordingly, in the sixth embodiment, only the difference from the fifth embodiment will be described, and the same members as those in the fifth embodiment are represented by the same reference numerals and description thereof will not be repeated.

In the protection device 60 of the embodiment, unlike the protection device 30 of the fifth embodiment, as shown in FIG. 6(*b*), side surfaces of the blowout section 11*e* in a direction connecting the first electrode 2*a* and the second electrode 2*b* are in rectangular shapes in sectional view. That is, the shapes of surfaces in a direction substantially perpendicular to the direction connecting the first electrode 2*a* and the second electrode 2*b* among surfaces of the blowout section 11*e* are rectangular shapes. Then, a heat-generating element lead-out electrode 19 is disposed between the blowout section 11*e* and the front surface 4*a* of the insulating substrate 4. The heat-generating element 17 and the insulating member 18 with which the heat-generating element 17 is coated are disposed on a rear surface 4*b* of the insulating substrate 4.

The heat-generating element lead-out electrode 19 is disposed to face the heat-generating element 17 through the insulating substrate 4. With this, the heat-generating element 17 is superimposed on the blowout section 11*e* of the fuse element 11 through the insulating substrate 4 and the heat-generating element lead-out electrode 19. With such a superimposed structure, it is possible to allow heat generated by the heat-generating element 17 to be efficiently transmitted to the blowout section 11*e*.

In the protection device 60 of the embodiment, similarly to the protection device 30 of the fifth embodiment, as shown in FIG. 6(*c*), a width 1*d* of the blowout section 11*e* in a plan view has a length ($\{1d/2d\}\times100\geq80(\%)$) equal to or greater than 80% of a width 2*d* of each of joining portions joining the first electrode 2*a* and the second electrode 2*b* to the blowout section 11*e*, is preferably is a length equal to or greater than 95% of the width 2*d* of each of the joining portions, and more preferably exceeds 100% of the width 2*d* of each of the joining portions.

In the protection device 60 of the embodiment, in a case where an abnormality occurs in the circuit board, electrical conduction is provided to the heat-generating element 17 by a current control device provided on the circuit board. With this, the heat-generating element 17 generates heat, the blowout section 11*e* is heated through the insulating substrate 4 and the heat-generating element lead-out electrode 19, and the blowout section 11*e* is blown out. With this, the first electrode 2*a* and the second electrode 2*b* are disconnected, and the current path of the circuit board is cut off.

In a case where the blowout section 11*e* is formed in such a manner that a low-melting-point metal layer 1*a* and high-melting-point metal layer 1*b* are laminated in a thickness direction, and in a case where electrical conduction is provided to the heat-generating element 17 by the current control device provided on the circuit board, the low-melting-point metal layer 1*a* of the blowout section 11*e* is heated and melted, the high-melting-point metal layer 1*b* is dissolved by a generated molten material of the low-melting-point metal layer 1*a*, and the blowout section 11*e* is quickly blown out.

Similarly to the protection device 30 of the fifth embodiment, the protection device 60 of the embodiment in which the width 1*d* of the blowout section 1*e* is the length equal to or greater than 80% of the width 2*d* of each of the joining portions joining the first electrode 2*a* and the second electrode 2*b* to the blowout section 11*e* has the blowout section 11*e* that has the large width 1*d* and low resistance, and can thus contribute to an increase in rated current.

In a case where a blowout temperature of the blowout section 11*e* in the protection device 60 of the embodiment is equal to or lower than 400° C., the first electrode 2*a* and the second electrode 2*b* can be restrained from reaching a high temperature at the time of blowout and adversely influencing a member connected to the first electrode 2*a* and the second electrode 2*b*, and the circuit board to which the first external connection electrode 42*a* and the second external connection electrode 42*b* are connected. Accordingly, the length of the blowout section 11*e* (the distance between the first electrode 2*a* and the second electrode 2*b*) can be reduced, to reduce the size of the protection device 60, and the rated current can be further increased, compared to a case where the blowout temperature of the blowout section 11*e* exceeds 400° C.

REFERENCE SIGNS LIST

1, 11, 15, 50: Fuse element
1*a*: Low melting-point metal layer
1*b*: High melting-point metal layer
1*e*, 11*e*, 15*e*, 51: Blowout section
1*f*, 11*f*, 15*f*, 52*a*: First joint portion
1*g*, 11*g*, 15*g*, 52*b*: Second joint portion
2*a*: First electrode
2*b*: Second electrode
3*a*, 3*b*: Attachment hole
4: Insulating substrate
4*a*: Front surface
4*b*: Rear surface
5: Cover member
6: Heat-generating element power feed electrode
7, 17: Heat-generating element
8, 18: Insulating member
9, 19: Heat-generating element lead-out electrode
9*a*: First heat-generating element electrode
9*b*: Second heat-generating element electrode
10, 20, 25, 40: Fuse device
20*a*: First terminal
20*b*: Second terminal
21*a*, 21*b*: Castellation
30, 60: Protection device
42*a*: First external connection electrode
42*b*: Second external connection electrode

What is claimed is:

1. A fuse device comprising:
an insulating substrate;
a first electrode and a second electrode provided on a front surface of the insulating substrate;
a fuse element;
a heat-generating element provided on the front surface or a rear surface of the insulating substrate;
an insulating material covering the heat-generating element;
a heat-generating element lead-out electrode electrically connected with the fuse element and disposed to face the heat-generating element; and
a cover member provided on the insulating substrate and covering the fuse element; wherein,
the fuse element comprises a flat plate-shaped blowout section with no through-hole disposed between the first electrode and the second electrode, wherein a length of a width of the flat plate-shaped blowout section has a length greater than 100% and equal to or less than 200% of a length of a width of each of joining portions joining the first electrode and the second electrode to the flat plate-shaped blowout section;
the fuse element is composed of a low melting-point metal layer and a high melting-point metal layer laminated on both surfaces of the low melting-point metal layer;
a side surface of the fuse element which is joined to the first electrode and a side surface of the fuse element which is joined to the second electrode are coated with the high melting-point metal layer;
side surfaces of the fuse element in a direction connecting the first electrode and the second electrode are not coated with the high melting-point metal layer, wherein the low melting-point metal layer is exposed on the side surfaces of the fuse element in the direction connecting the first electrode and the second electrode;
the fuse element is connected to the first electrode and the second electrode via solder;
leakage of the low melting-point metal layer from the side surface to a junction of the fuse element and the first electrode and to a junction of the fuse element and the second electrode does not occur;
inflow of the solder to the low melting-point metal layer does not occur;
the heat-generating element and the heat-generating element lead-out electrode are electrically connected; and
the low melting-point metal layer and the solder provided between the fuse element and the first electrode is not in direct physical contact and the low melting point metal layer and the solder provided between the fuse element and the second electrode is not in direct physical contact.

2. The fuse device according to claim 1, wherein a blowout temperature of the flat plate-shaped blowout section is 140° C. to 400° C.

3. The fuse device according to claim 1, wherein the low melting-point metal layer is composed of Sn or an alloy containing Sn as a primary constituent, and wherein the high melting-point metal layer is composed of any one selected from Ag, Cu, an alloy containing Ag as a primary constituent, and an alloy containing Cu as a primary constituent.

4. The fuse device according to claim 3, wherein a ratio of a total thickness of the low melting-point metal layer to a total thickness of the high melting-point metal laver is 1:1 to 50:1.

5. The fuse device according to claim 1, wherein the flat plate-shaped blowout section is joined to the first electrode and the second electrode by the solder.

6. A protection device comprising:
the fuse device according to claim 1, wherein the fuse element is disposed across the first electrode and the second electrode.

7. The fuse device according to claim 1, wherein the flat plate-shaped blowout section and the insulating substrate are configured with a space formed between the flat plate-shaped blowout section and the front surface of the insulating substrate.

8. The fuse device according to claim 1, wherein the first electrode and the second electrode are each coated with an electrode protection layer which is any one of a group consisting of a Sn-plated film, a Ni/Au-plated film, a Ni/Pd-plated film, and a Ni/Pd/Au-plated film.

9. The fuse device according to claim 1, further comprising:
a first external connection electrode and a second external connection electrode on the rear surface of the insulating substrate; and
a first castellation and a second castellation on a side surface of the insulating substrate, wherein the first external connection electrode and the first electrode is connected via the first castellation, and the second external connection electrode and the second electrode is connected via the second castellation.

10. The fuse device according to claim 1, wherein the heat-generating element is provided on the front surface, wherein the heat-generating element lead-out electrode is formed on the insulating material, wherein the fuse element and the heat-generating element lead-out electrode are electrically connected, and wherein the flat plate-shaped blowout section of the fuse element is superimposed on the heat-generating element through the insulating material and the heat-generating element lead-out electrode.

11. The fuse device according to claim 1, wherein the heat-generating element is provided on the rear surface, wherein the heat-generating element lead-out electrode is provided on the front surface, and the fuse element and the heat-generating element lead-out electrode are electrically connected, and wherein the flat plate-shaped blowout section of the fuse element is superimposed on the heat-generating element through the insulating substrate and the heat-generating element lead-out electrode.

* * * * *